US010915116B2

(12) United States Patent
Teng et al.

(10) Patent No.: US 10,915,116 B2
(45) Date of Patent: Feb. 9, 2021

(54) DISTRIBUTED TRAFFIC SCHEDULING FOR AUTONOMOUS SELF-DRIVING VEHICLES

(71) Applicant: INTERNATIONAL BUSINESS MACHINES CORPORATION, Armonk, NY (US)

(72) Inventors: Qi Ming Teng, Beijing (CN); Jinho Hwang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 16/211,782

(22) Filed: Dec. 6, 2018

(65) Prior Publication Data

US 2020/0183419 A1  Jun. 11, 2020

(51) Int. Cl.
*G05D 1/02* (2020.01)
*G06Q 40/08* (2012.01)
(Continued)

(52) U.S. Cl.
CPC ......... *G05D 1/0291* (2013.01); *G05D 1/0088* (2013.01); *G06N 20/10* (2019.01);
(Continued)

(58) Field of Classification Search
CPC ...... G05D 1/0291; G05D 1/02; G08G 1/0967; G08G 1/01; G08G 1/16; B60W 30/165; B60K 31/00; G06Q 40/08; G01C 21/34
See application file for complete search history.

(56) References Cited

U.S. PATENT DOCUMENTS 8,965,621 B1  2/2015  Urmson et al.
9,576,083 B2  2/2017  Kozloski et al.
(Continued)

FOREIGN PATENT DOCUMENTS

JP      H10105885 A    4/1998

OTHER PUBLICATIONS

Litman, "Autonomous Vehicle Implementation Predictions: Implications for Transport Planning", Victoria Transport Policy Institute, Jul. 24, 2018, 39 pages.
(Continued)

*Primary Examiner* — Yuri Kan
(74) *Attorney, Agent, or Firm* — Tutunjian & Bitetto, P.C.; Joseph Petrokaitis

(57) ABSTRACT

Distributed traffic scheduling for autonomous self-driving vehicles includes forming a vicinity group of autonomous vehicles by pinging each other using vehicle-to-vehicle communication. A leader vehicle of the vicinity group is elected by transmitting an election messages between each of the autonomous vehicles, each autonomous vehicle responding to a received election message with a vote, the leader vehicle being elected by receiving the most votes. Preferences of a driver of each of the autonomous vehicles are predicted with a classifier by extracting preference labels from online account data. Trip deadline is determined for each autonomous vehicle according to the preferences. Each of the autonomous vehicles in the vicinity group is scheduled to prevent exceeding the trip deadline by performing earliest deadline first scheduling by the leader vehicle. Maneuvers of each of the autonomous vehicles in the vicinity group are controlled according to the scheduling.

20 Claims, 5 Drawing Sheets

(51) Int. Cl.
*B60W 30/165* (2020.01)
*G01C 21/34* (2006.01)
*B60K 31/00* (2006.01)
*G08G 1/16* (2006.01)
*G08G 1/01* (2006.01)
*G08G 1/0967* (2006.01)
*G06N 20/10* (2019.01)
*G08G 1/00* (2006.01)
*H04W 4/46* (2018.01)
*G05D 1/00* (2006.01)

(52) U.S. Cl.
CPC ............... *G08G 1/22* (2013.01); *H04W 4/46* (2018.02); *G05D 2201/0213* (2013.01)

(56) References Cited

U.S. PATENT DOCUMENTS

| | | | |
|---|---|---|---|
| 9,766,625 B2 | 9/2017 | Boroditsky et al. | |
| 9,766,629 B1* | 9/2017 | Konchan | B62D 15/0285 |
| 2013/0116909 A1* | 5/2013 | Shida | B60K 31/00 |
| | | | 701/96 |
| 2015/0276415 A1* | 10/2015 | Shrinath | G01C 21/34 |
| | | | 701/1 |
| 2016/0260328 A1* | 9/2016 | Mishra | G01S 5/0072 |
| 2017/0075358 A1 | 3/2017 | Zhang | |
| 2017/0169709 A1* | 6/2017 | Ando | G08G 1/161 |
| 2017/0297586 A1 | 10/2017 | Li | |
| 2018/0237012 A1* | 8/2018 | Jammoussi | G05D 1/0088 |
| 2019/0051159 A1* | 2/2019 | Wang | G08G 1/0133 |
| 2019/0189007 A1* | 6/2019 | Herman | G08G 1/096758 |
| 2019/0220930 A1* | 7/2019 | Clark | G08B 21/02 |

OTHER PUBLICATIONS

Cooney, "IBM Technology Creates Smart Wingman for Self-Driving Cars", Network World, Layer 8, Mar. 30, 2017, 5 pages.
Anonymous, "System and Method to Optimize Traffic Around Autonomous Vehicle Schedules", An IP.com Prior Art Database Technical Disclosure, Jun. 23, 2016, 2 pages.

* cited by examiner

```
┌─────────────────────────────────────────────────────────────────┐
│  Form a vicinity group of autonomous vehicles within a vicinity  │
│  of each other by pinging each of the autonomous vehicles with  │
│  each other of the autonomous vehicles using vehicle-to-vehicle │
│  communication                                                   │
│                              501                                 │
└─────────────────────────────────────────────────────────────────┘
                                │
                                ▼
┌─────────────────────────────────────────────────────────────────┐
│  Elect a leader of the vicinity group by transmitting an         │
│  election message to each of the autonomous vehicles from each  │
│  other of the autonomous vehicles, each autonomous vehicle      │
│  responding to a received election message with a vote, the    │
│  leader being elected by receiving the most votes of the        │
│  autonomous vehicles in the vicinity group                      │
│                              502                                 │
└─────────────────────────────────────────────────────────────────┘
                                │
                                ▼
┌─────────────────────────────────────────────────────────────────┐
│  Predict preferences of a driver corresponding to each of the   │
│  autonomous vehicles with a classifier by extracting online    │
│  account data and predicting preference labels for each feature │
│  of the online account data                                     │
│                              503                                 │
└─────────────────────────────────────────────────────────────────┘
                                │
                                ▼
┌─────────────────────────────────────────────────────────────────┐
│  Learn the preference labels by training a support vector       │
│  machine with the predicted preferences                         │
│                              504                                 │
└─────────────────────────────────────────────────────────────────┘
                                │
                                ▼
┌─────────────────────────────────────────────────────────────────┐
│  Determine a trip deadline for each autonomous vehicle          │
│  according to the corresponding preferences                     │
│                              505                                 │
└─────────────────────────────────────────────────────────────────┘
                                │
                                ▼
┌─────────────────────────────────────────────────────────────────┐
│  Schedule each of the autonomous vehicles in the vicinity group │
│  to prevent exceeding the trip deadline by performing earliest  │
│  deadline first scheduling of the vicinity group by the leader  │
│  vehicle                                                         │
│                              506                                 │
└─────────────────────────────────────────────────────────────────┘
                                │
                                ▼
┌─────────────────────────────────────────────────────────────────┐
│  Control maneuvers of each of the autonomous vehicles in the    │
│  vicinity group according to the scheduling                     │
│                              507                                 │
└─────────────────────────────────────────────────────────────────┘
```

FIG. 5

DISTRIBUTED TRAFFIC SCHEDULING FOR AUTONOMOUS SELF-DRIVING VEHICLES

BACKGROUND

Technical Field

The present invention generally relates to autonomous navigation, and more particularly to distributed traffic scheduling for autonomous self-driving vehicles.

Description of the Related Art

Autonomous vehicles operate and navigate with minimal input from a human driver. However, the actions of other vehicles can affect decisions made by the autonomous vehicle, such as, e.g., route duration, route preferences, lane changing, braking, speed, among other actions. Moreover, vehicle-to-vehicle (V2V) communications systems may lack the knowledge to appropriately respond to changing traffic conditions based on the needs of a human driver. As such, autonomous vehicles behave in a reactive fashion that may not suit a human driver's preferences.

SUMMARY

In accordance with an embodiment of the present invention, a method for scheduling traffic of autonomous vehicles is presented. The method includes forming a vicinity group of autonomous vehicles by pinging other using vehicle-to-vehicle communication. A leader vehicle of the vicinity group is elected by transmitting an election message to each of the autonomous vehicles from each other of the autonomous vehicles, each autonomous vehicle responding to a received election message with a vote, the leader vehicle being elected by receiving the most votes of the autonomous vehicles in the vicinity group. Preferences of a driver corresponding to each of the autonomous vehicles are predicted with a classifier by extracting preference labels from online account data. A trip deadline is determined for each autonomous vehicle according to the corresponding preferences. Each of the autonomous vehicles in the vicinity group is scheduled to prevent exceeding the trip deadline by performing earliest deadline first scheduling of the vicinity group by the leader vehicle. Maneuvers of each of the autonomous vehicles in the vicinity group are controlled according to the scheduling and all vehicles participated in the leader election should agree on the scheduling decisions made by the leader.

In accordance with another embodiment of the present invention, a method for scheduling traffic of autonomous vehicles is presented. The method includes forming a vicinity group of autonomous vehicles by pinging other using vehicle-to-vehicle communication. A leader of the vicinity group is elected by transmitting an election message to each of the autonomous vehicles from each other of the autonomous vehicles, each autonomous vehicle responding to a received election message with a vote, the leader being elected by receiving the most votes of the autonomous vehicles in the vicinity group. Preferences of a driver corresponding to each of the autonomous vehicles are predicted with a classifier by extracting online account data and predicting preference labels for each feature of the online account data. The preference labels are learned by training a support vector machine with the predicted preferences. A trip deadline is determined for each autonomous vehicle according to the corresponding preferences. Each of the autonomous vehicles in the vicinity group is scheduled to prevent exceeding the trip deadline by performing earliest deadline first scheduling of the vicinity group by the leader vehicle, including, calculating a priority of each autonomous vehicle in the vicinity group according to a laxity of the trip deadline compared to an expected arrival time, and generating a scheduling decision for one of the autonomous vehicle having a highest priority such that an average expected arrival time of the autonomous vehicles in the vicinity group is within an average deadline of the autonomous vehicles in the vicinity group. Maneuvers of each of the autonomous vehicles in the vicinity group are controlled according to the scheduling such that a group controller corresponding to each vehicle in the vicinity group agrees to the maneuvers.

In accordance with another embodiment of the present invention, a leader vehicle for scheduling traffic of autonomous vehicles is presented. The leader vehicle includes a communication system that communicates with nearby autonomous vehicles to form a vicinity group of autonomous vehicles by pinging each other of the autonomous vehicles using vehicle-to-vehicle communication. A vote counter elects a leader vehicle of the vicinity group by transmitting an election message to each autonomous vehicle of the vicinity group, responding to a received election message with a vote, and counting votes received to compare with each of the autonomous vehicles and determine the leader. A preference engine uses a classifier to predict preferences of a driver by extracting preference labels from online account data stored in a storage device. A deadline calculator determines a trip deadline according to the predicted preferences. A scheduler schedules vehicle maneuvers to prevent exceeding the trip deadline by performing earliest deadline first scheduling. A group controller controls maneuvers according to the scheduling such that a group controller corresponding to each vehicle in the vicinity group agrees to the maneuvers.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 5 is a block/flow diagram showing a system/method of distributed traffic scheduling for the autonomous vehicles, in accordance with an embodiment of the present invention.

DETAILED DESCRIPTION

According to an embodiment of the present invention, autonomous vehicles are equipped with a processing system including vehicle-to-vehicle (V2V) communication that coordinates with nearby vehicles to elect a leader which performs traffic scheduling according to driver preferences and needs.

The autonomous vehicle includes a preference engine, a leader election module and a traffic scheduling modules. To improve autonomous and self-driving navigation, the autonomous vehicle can communicate by the V2V with nearby autonomous vehicles. Each vehicle and respond to the communication and form a vicinity group of autonomous vehicles. The vicinity group communicate to coordinate traffic decisions of each vehicle in the vicinity group.

To facilitate the coordination, the vicinity group elects a leader. Using the V2V communication, each vehicle can communicate with each other vehicle in the vicinity group and ping each vehicle. The pings are used as an election request, to which the receiving vehicle responds. The vehicle of the vicinity group that receives the most responses is elected leader.

The leader coordinates the traffic movements of each of the vehicles of the vicinity group using driver preferences in each of the vehicles. Thus, each vehicle includes a preference engine that can determine the preferences of corresponding driver. For example, the preference engine can analyze online and offline account information belong to the driver, such as, e.g., calendar, email, messaging, or other accounts. Using the account information, the preference engine can predict preferences such as, e.g., trip deadlines, speed, passing decisions, braking, route preferences, among other preferences related to a trip.

The leader can schedule traffic according to the preferences by determining deadlines, distances, route, and other driving decisions. For example, the leader can prioritize some vehicles above others according to corresponding deadlines. As such, the leader can instruct each vehicle in the vicinity group to maintain a speed and a lane to facilitate vehicle priority. For example, a vehicle with an earliest deadline can be instructed to increase in speed, while a lower priority vehicle can be instructed to decrease speed and/or change lanes to allow the vehicle with the earliest deadline to pass. Similarly, the leader can instruct a vehicle to pass lower priority vehicles. Thus, the leader can schedule vehicle behaviors to attain optimum speeds and routes for the vicinity group.

Exemplary applications/uses to which the present invention can be applied include, but are not limited to: autonomous vehicle operation including self-driving cars, drones, aircraft, watercraft, and others.

Figure 1:
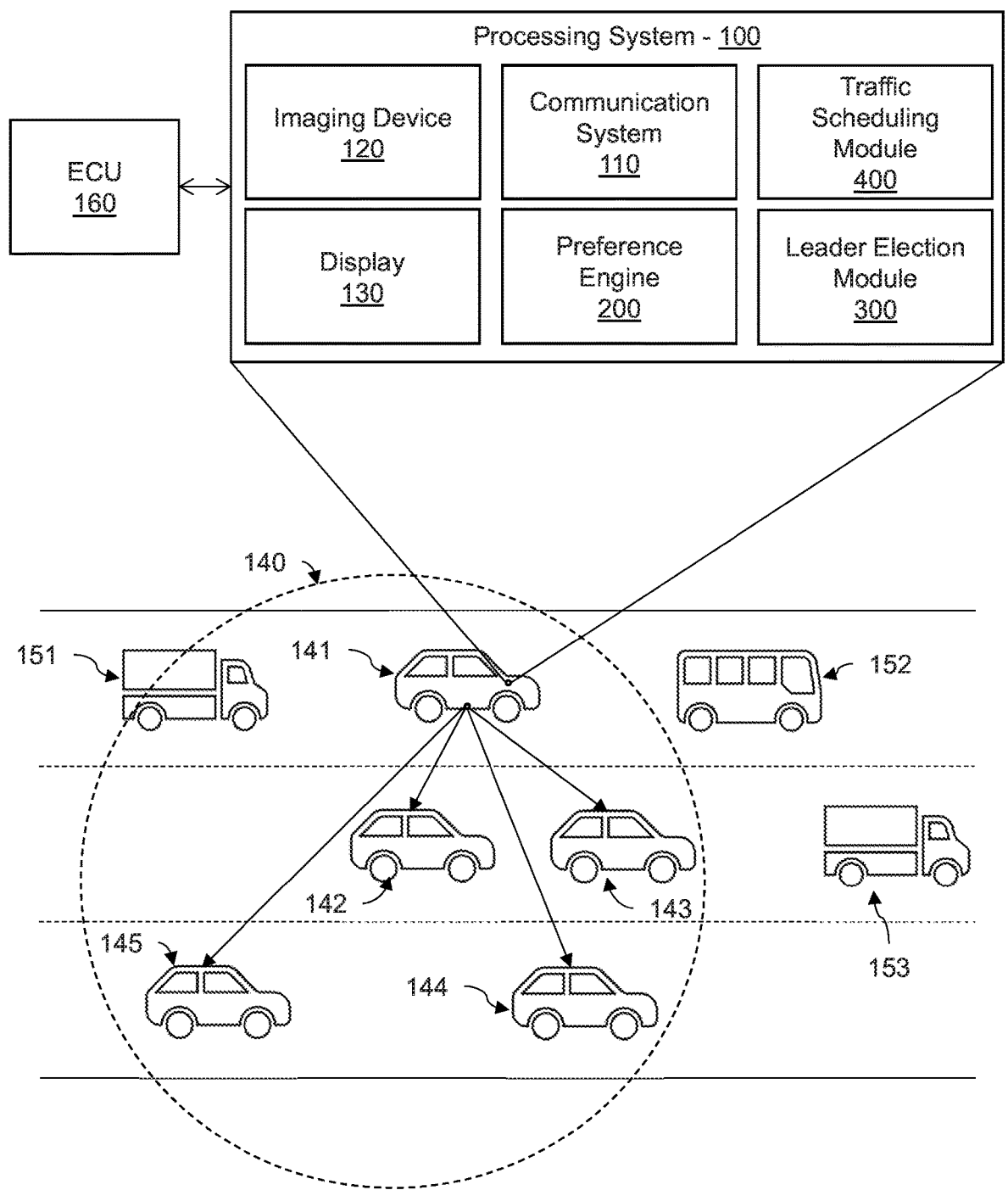
FIG. 1 is a diagram showing a vicinity group of autonomous vehicles with distributed traffic scheduling for the autonomous vehicles, in accordance with an embodiment of the present invention.

Referring now to the drawings in which like numerals represent the same or similar elements and initially to FIG. 1, a diagram showing a vicinity group of autonomous vehicles with distributed traffic scheduling for the autonomous vehicles is depicted according to an embodiment of the present invention.

According to an embodiment of the present invention, a variety of vehicle can occupy a roadway, such as, e.g., a highway. For example, there can be trucks 151 and 153, buses 152, as well as autonomous vehicles 141-145. The autonomous vehicles 141-145 can be the autonomous vehicles within a vicinity out of a larger number of autonomous and non-autonomous vehicles travelling along the roadway.

To facilitate traffic scheduling amongst autonomous vehicles on the road, each of the autonomous vehicles, including the autonomous vehicles 141-145, can include a processing system 100. The processing system 100 includes a communication system 110 for vehicle-to-vehicle (V2V) communication amongst the autonomous vehicles 141-145. The processing system 100 can be a part of the vehicle's electronic control unit (ECU) 160, or can be a separate processing system. For example, the processing system 100 can include, e.g., a processor, memory devices, storage devices, sensors, random access memory (RAM), read only memory (ROM), among other components, distinct from the ECU. In such case, the processing system 100 can be mounted within the vehicle, e.g., as an integral component, or as an add-on device that can communicate with other parts of the vehicle upon after-market installation, such as, e.g., with the vehicle's ECU 160. Therefore, the processing system 100 can be, e.g., an integral or non-integral attachment to the vehicle 141 that can control vehicle maneuvers through communication with other vehicle components such as, e.g., the ECU 160.

Using the communication system 110, each autonomous vehicle 141-145 can ping each other autonomous vehicle 141-145 using a short range communication standard, such as, e.g., millimeter wave (mm wave) communication, or any other communication standard to form an ad-hoc mesh network of vehicle communication systems 110. By pinging each vehicle, the autonomous vehicles 141-145 can identify a group of autonomous vehicles in a nearby vicinity (a vicinity group 140). Each of the autonomous vehicles 141-145 of the vicinity group 140 can, therefore, maintain communication in the ad-hoc network to coordinate driving decisions and traffic scheduling.

Each vehicle 141-145, therefore, can provide information regarding traffic using an imaging device 120 included with the processing system 100. The imaging device 120 can be, e.g., a video or still image camera, a radar sensor, a light detection and ranging (LiDAR) sensor, infrared sensors, among any other sensors for capturing images of the roadway and combinations thereof. The captured images from the imaging device 120 can provided to each of the autonomous vehicles 141-145 in the vicinity group 140 to inform the autonomous vehicles 141-145 of environmental conditions and traffic conditions, such as, e.g., locations, trajectories and speeds of trucks 151, 153 and busses 152. Accordingly, each of the autonomous vehicles 141-145 in the vicinity group 140 have access to detailed information regarding the surroundings of the vicinity group 140 for improved coordination and decision making.

However, a central scheduler can further improve scheduling of traffic maneuvers and autonomous vehicle 141-145 navigation. Therefore, the processing system 100 can include a leader election module 300. The leader election module 300 communicates across the vicinity group 140 with the autonomous vehicles 141-145 to determine a leader of the vicinity group 140 using, e.g., a leader election algorithm, such as, e.g., a bully algorithm, a ring election algorithm, a Chang and Roberts algorithm, or other suitable algorithm for selecting a leader from among a distributed network of vehicles in the vicinity group 140.

The leader is selected to perform the scheduling of driving maneuvers and navigation using information provided by each of the autonomous vehicles 141-145 via, e.g., the respective imaging devices 120. Accordingly, the leader can receive information from each of the autonomous vehicles 141-145 regarding vehicle speed, trajectory, destination, and location among other route characteristics. Using the information, the leader controls driving and navigation behaviors of vehicles within the vicinity group 140 to efficiently and proactively maneuver the autonomous vehicles 141-145 through the roadway to facilitate on time arrival of each driver.

Moreover, the leader can be provided with driver preferences corresponding to the operator of each of the autonomous vehicles 141-145 in the vicinity group 140. The preferences can be determined by a preference engine 200 in the processing system 100 of each of the autonomous vehicles 141-145. The preference engine 200 can access the operator's online and offline digital services, e.g., cloud storage, email, calendar, messaging applications, social media, navigation history, among other services. Data from digital services, including, e.g., appointments, regular commutes, dining reservations, meetings, commitments, driving habits (such as, e.g., speed, braking, lane changing, toll road usage, highway usage, among others), and other data, can be analyzed to learn driving preferences. As such, the preference engine 200 can include, e.g., a machine learning algorithm including, e.g., a neural network or other artificial intelligence system, to learn preferences from the data. For example, the preference engine 200 can include a memory or storage device containing a model, such as, e.g., a support vector machine (SVM) for learning multi-label preferences from the data, and implemented by a processing device such as, e.g., a central processing unit (CPU), graphical processing unit (GPU), resistive processing unit (RPU), or other processor. The preference engine 200 can use the preferences to determine trip routes and trip times for a corresponding operator of each of the autonomous vehicles 141-145 of the vicinity group 140.

Using the trip routes and trip times, the leader can schedule traffic behavior for the vicinity group 140 using a traffic scheduling module 400 of the processing system 100. The traffic scheduling module 400 can use the preferences and trip routes and times to schedule actions corresponding to each of the autonomous vehicles 141-145 of the vicinity group 140. To schedule the actions of the vehicles, the traffic scheduling module 400 of the leader can determine a priority queue according to trip deadlines determined from the preferences, trip routes and trip times. The traffic scheduling module 400 can then dynamically schedule vehicle maneuvers, such as, e.g., speed increase or decrease, lane shifting, passing, braking, and other maneuvers, according to changing conditions in the roadway. The schedule can be continuously updated to facilitate optimizing the schedule at any moment in time for the vicinity group 140. In-so-doing, the traffic scheduling module 400 determines an optimum schedule that more effectively and more efficiently directs the actions of the autonomous vehicles 141-145 to permit on-time arrival of each of the corresponding occupants.

The processing system 100 of each of the autonomous vehicles 141-145 can include a display 130 to display route and schedule information to occupants of each of the autonomous vehicles 141-145. Thus, the occupants can be notified of expected arrival times as well as other route information. Moreover, the display 130 can include an input, such as, e.g., corresponding buttons or a touch sensitive layer, such that the occupants can accept or decline the scheduled maneuvers of the autonomous vehicle 141-145 corresponding to the occupant. The input of the display 130 can also include a function for changing or manually inputting preferences, such as, e.g., the preferences described above. Accordingly, while the processing system 100 can perform scheduling autonomously, the occupants can also provide control for the maneuvering and actions of each of the autonomous vehicles 141-145.

Figure 2:
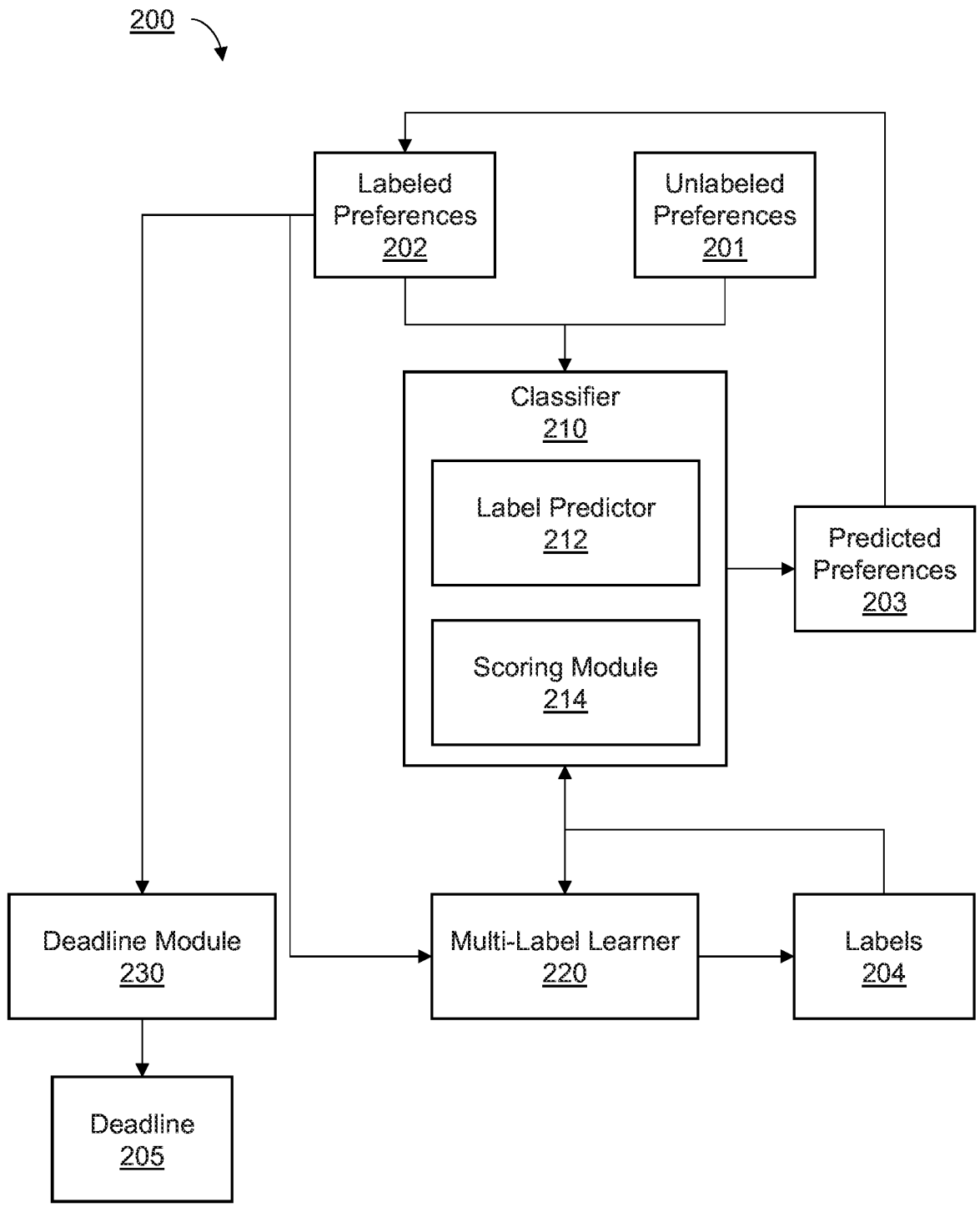
FIG. 2 is a diagram showing a preference learning engine of an autonomous vehicle for distributed traffic scheduling, in accordance with an embodiment of the present invention.

Referring now to FIG. 2, a diagram showing a preference learning engine of an autonomous vehicle for distributed traffic scheduling is depicted according to an embodiment of the present invention.

According to aspects of the present embodiment, a preference engine 200, such as the preference engine 200 described above can determine preferences of a driver of an autonomous vehicle. For example, the preference engine 200 can include, e.g., software stored in a memory or storage device and executed by a processor. The preference engine 200 can access data stored in a storage device, database, or cloud network via a communication network, such as, e.g., a bus, a wired or wireless connection, the internet, or other communication technique.

The preference engine 200 can use data provided by digital services corresponding to a user to determine route and navigation preferences. Such preferences can include, e.g., arrival time, safety preferences, toll road usage, stops, destination location, passing and lane change preferences, among others. The preference engine 200 learns the preferences form digital services corresponding to the driver, such as, e.g., online accounts including, e.g., social media, calendars, email, text communication, navigation history, daily schedule, tracked daily patterns, among other information. Based on the preferences, the preference engine determined an arrival deadline 205 for a given trip.

To determine preferences of the driver, the preference engine 200 can include a classifier 210 that predicts labeled preferences 203 using a set of labeled preferences 202 and a set of unlabeled preferences 201. The labeled preferences 202 are preferences that are already known. Unlabeled preferences 201 include a set of information that does not have a known association with a preference. Therefore, the classifier 210 uses the labeled preferences 202 as a training set to reduce loss of predicting labels for the unlabeled preferences 201 by generating the predicted preferences 203.

Labels of the unlabeled preferences 201 are predicted with a label predictor 212. The label predictor 212 can include a loss reduction (LR) based prediction to predict a label vector corresponding to the labels of preferences in the unlabeled preferences 201. The LR based prediction can include, e.g., maximum loss reduction with maximal confidence. As such, the LR based prediction can include, e.g., a techniques including equation 1 below:

$$D_s^* = \underset{D_s}{\mathrm{argmax}} \left( \sum_{X \in D_s} \sum_{i=1} ((1 - \bar{y}^i f_i(x))/2) \right), \qquad \text{Equation 1}$$

where D is a set of preferences, s is a set of example labels, $D^*_s$ is a set of predicted preferences with the example labels, $D_s$ is a set of all preferences with example labels, X is a set of data corresponding to the digital service information described above, i is a class of labels, $\bar{y}$ is a label vector, $f_i$ is a SVM classification function, and x is a feature vector corresponding to one or more of the digital service data. Thus, the LR prediction uses the classification function $f_i$ to predict a label such that maximizing equation 1 predicts the label vector $\bar{y}$.

Using the predicted label vector $\bar{y}$, a scoring module can apply the label vector $\bar{y}$ and the classification function $f_i$ to determine a score for each feature vector x in the set of unlabeled preferences 201. The score corresponds to a confidence of accuracy of the predicted label vector. To determine the confidence, the scoring module 214 can implement a scoring algorithm, such as, e.g., equation 2 below:

$$\text{score}(x) = \sum_{i=1}^{k} ((1 - \overline{y}^i f_i(x))/2), \quad \text{Equation 2}$$

where k is the total number of classes of labels and score(x) is the loss reduction score for the label vector of a feature vector x. A larger loss reduction score corresponds to a lower error, and thus higher confidence. Thus, to maximize confidence, the scoring module 214 can then select a set of predicted preferences $D^*_s$ having the highest scores. For example, the scoring module 214 can sort each of the scores and select the, e.g., five predicted preferences $D^*_s$ with the highest scores. Alternatively, the scoring module 214 can select the predicted preferences $D^*_s$ having a score above a predetermine confidence threshold, such as, e.g., 0.8.

The classifier 210 can then add the predicted preferences 203 determined by the label predictor 212 and scoring module 214 into the set of labeled preferences 202. Accordingly, the set of labeled preferences 202 is continually growing as more data is fed into the classifier 210 from the online services. As such, preferences of the driver become more accurate for better prediction of deadlines 205.

The labels applied to the preferences can also be learned by training a multi-label learner 220. The multi-label learner 220 includes, e.g., a neural network for multi-label learning, a boosting technique, k-nearest neighbors, decision trees, or other technique for mapping multiple labels to each feature vector x. The labels can be incorporated into the classifier 210 and the corresponding classification function $f_i$ to predict labels for each feature vector x.

A deadline module 230 can use the set of labeled preferences 202 to identify a deadline for the driver. The deadline module 230 incorporates the labels of the labeled preferences 202 into route selection to navigation to a destination input by the driver or included in the set of labeled preferences 202. As a result, the deadline module 230 determines the deadline for arriving at the destination.

Figure 3:
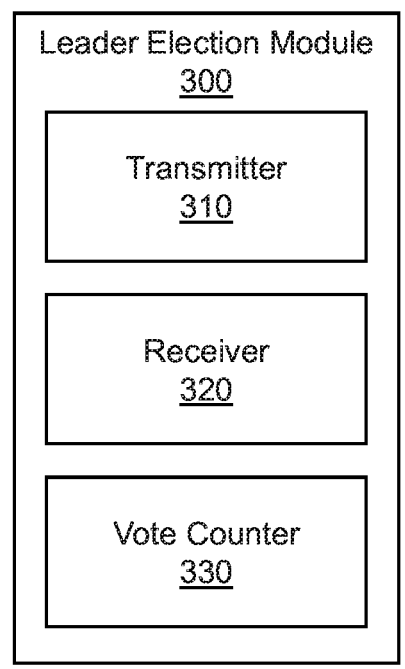
FIG. 3 is a diagram showing a leader election module for determining a leader of a vicinity group of autonomous vehicles to perform distributed traffic scheduling, in accordance with an embodiment of the present invention.

Referring now to FIG. 3, a diagram showing a leader election module for determining a leader of a vicinity group of autonomous vehicles to perform distributed traffic scheduling is depicted according to an embodiment of the present invention.

According to aspects of the present invention, a leader is elected from amongst the vehicles in the vicinity group. Each of the vehicles can include a leader election module 300, such as the leader election module 300 described above. The leader election module 300 implements a leader election algorithm including, e.g., a bully algorithm, stored in a memory or storage device and implemented by a processing device.

The leader election module 300 includes a transmitter 310 and a receiver 320. The leader election module 300 uses the transmitter 310 to communicate with other vehicles. In particular, the transmitter 310 sends an election message to each of the vehicles. The election message can include, e.g., a ping with an identification, or other message for identifying the source and destination vehicles.

The other vehicles can each receive the election message and respond with a vote. The vote can be any response message, such as, e.g., a return of the ping. The response acts a vote for the vehicle sending the election message. Each vehicle in the vicinity group pings each other vehicle. Vehicles that receive pings also respond to the received pings by, e.g., returning the ping or responding with a suitable response message. Therefore, two-way communication can be verified between vehicles. Because the response acts a vote, the vehicle that receives the most votes can be elected leader. Thus, the votes can be received at the vehicle by a receiver 320. Each vote can be tallied by a vote counter 330.

The vote counter 330 generates a tally of votes for the vehicle. The tally of each vehicle in the vicinity group can be compared by sharing the respective tallies with, e.g., the transmitter 310 and receiver 320. The vehicle having the highest tally is determined as the leader because the vehicle with highest tally has verified two-way communication with the largest number of vehicles in the vicinity group. Thus, the leader election module 300 can communicate with the leader election modules 300 of each vehicle in the vicinity group to determine the leader of the vicinity group. The leader can then coordinate the actions of the vehicles in the vicinity group to schedule efficient traffic behaviors of each of the vehicles.

Figure 4:
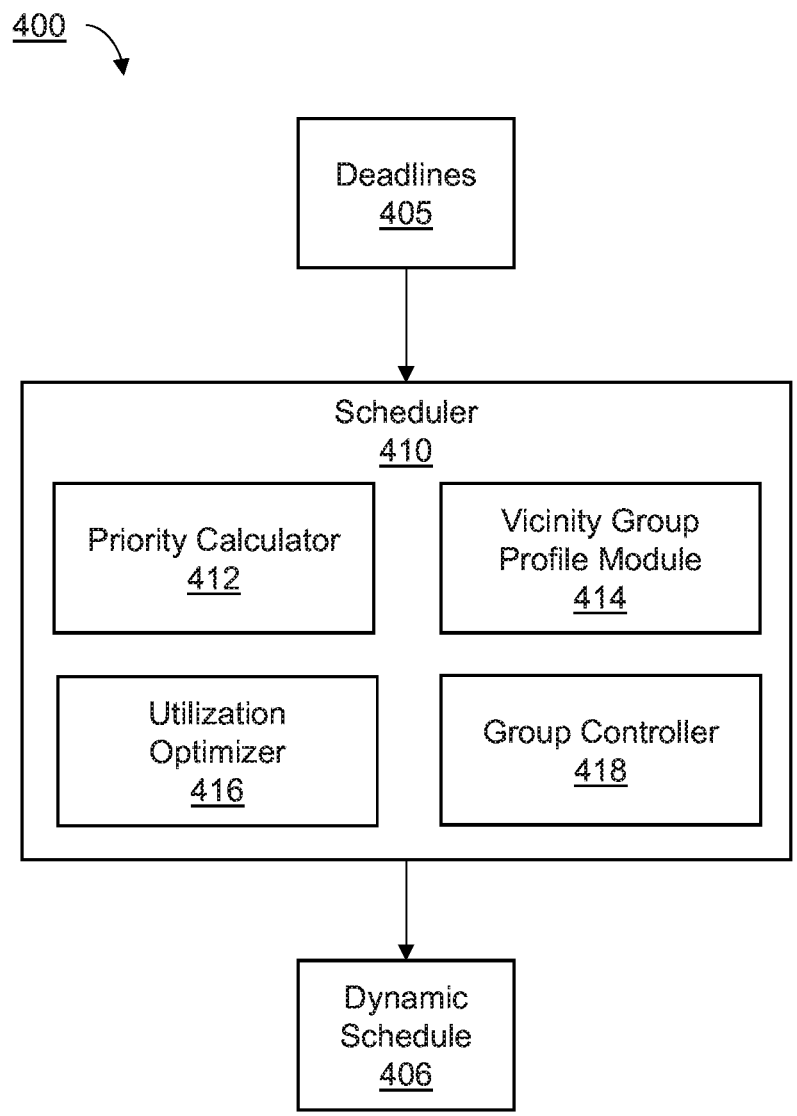
FIG. 4 is a diagram showing a traffic scheduling module of an autonomous vehicle in a vicinity group of autonomous vehicles for distributed scheduling of the vicinity group, in accordance with an embodiment of the present invention.

Referring now to FIG. 4, a diagram showing a traffic scheduling module of an autonomous vehicle in a vicinity group of autonomous vehicles for distributed scheduling of the vicinity group is depicted according to an embodiment of the present invention.

According to an embodiment of the present invention, a leader of a vicinity group of autonomous vehicles can schedule traffic behavior of each vehicle using a scheduler 410. Each vehicle can be equipped with a scheduler 410, however, the leader, as coordinator for the vicinity group, has priority over the schedulers 410 of the other vehicles.

The scheduler 410 can receive deadlines 405 for each of the vehicles in the vicinity group. The deadlines 405 can be deadlines generated from, e.g., a preference learning stage, such as, e.g., the preference engine described above with reference to FIG. 2, or from driver input, or any other deadlines for a vehicle trip. Using the deadlines 405 from each of the vehicles, the schedule 410 of the leader vehicle can generate a dynamic schedule 406 that is regularly updated according to changing conditions such that an optimal positioning and trajectory of each vehicle in the vicinity group is attained to facilitate each vehicle meeting corresponding deadlines for a trip. For example, the dynamic schedule 406 can dictate a lane and a speed for each vehicle in the vicinity group.

The scheduler 410 can be designed to determine the scheduling that minimized the maximum lateness among the vehicles in the vicinity group. To do so, a vicinity group profile module 414 of the scheduler 410 collects in a memory or storage device a profile corresponding to each of the vehicles of the vicinity group, including the deadlines 405 as well as current driving behaviors of each vehicle, including lane, distance remaining p, speed s and time remaining c.

A priority calculator 412 can analyze the vicinity group profiles in the vicinity group profile module 414. In particular, the priority calculator 412 can receive the profiles from the vicinity group profile module. The priority calculator 412 uses the distance remaining p and current speed s to determine time remaining c until arrival.

The scheduler 410 can optimize scheduling to reduce maximum lateness. Thus, preempting late arrivals can improve scheduling. As such, the priority calculator 412 can set the priority of each vehicle according to a risk of late arrival. Therefore, the priority calculator 412 can determine a laxity l value can be determined from a difference between a time until a deadline d and the trip time remaining c.

The laxity l represents how close to being a late a given vehicle is according to a current traffic scenario, such as, e.g., lane arrangement and vehicle speeds. The priority of the vehicles for scheduling can, therefore, be determined according to the laxity l. For example, a higher laxity l indicates a greater buffer between an expected arrival time and a deadline 405. As a result, a high laxity l would result in the corresponding vehicle being given lower priority. In contrast, a low laxity l results in higher priority vehicle scheduling. The vehicles of the vicinity group are then sorted according to priority using a sorted queue, such as, e.g., an $O(n^2)$ sorted queue.

The priority of each vehicle can be reassessed, for example, continually or periodically in response to an elapsed time or in response to a change in traffic conditions. As described above, traffic conditions can be received in real time via an imaging sensor. Thus, the leader is continually be provided with conditions on the roadway, including traffic, objects, lanes, and other conditions.

Vehicle priority as determined by the priority calculator 412 can be provided to a utilization optimizer 416 to optimize a traffic schedule. The utilization optimizer 416 produces schedules for vehicle maneuvers according to priority by scheduling for the highest priority vehicle first. For example, the utilization optimizer 415 schedules an increase in step speed of high priority vehicles, a decrease in step speed of low priority vehicles, a change lane change for a vehicle in a lane behind a vehicle of different speed, and other vehicle maneuvers for navigating traffic for the highest priority vehicle.

However, to facilitate all vehicles reaching a corresponding destination in time, the utilization optimizer 416 can implement a schedulability test to prevent exceeding the availability of the vehicles. The schedulability test can include, e.g., an earliest deadline first (EDF) scheduling scheme to optimize the scheduling. Such a scheduling scheme schedules vehicle maneuvers to minimize maximum lateness by utilizing the above described priority scheduling according to an average utilization of the vehicles of the vicinity group that does not exceed an availability of the vehicles. Thus, average utilization can be, e.g., a function of vehicle arrangement (lane positions), speed and other factors, such that scheduling vehicles includes the adjustment of the utilization factors. Average utilization can be determined by the utilization optimizer 416 according to, e.g., equation 3 below:

$$\mu = \sum_{i=1}^{n} \frac{c_i}{p_i}, \quad \text{Equation 3}$$

where $\mu$ is the average utilization of the vehicles, i denotes a given vehicle, n is the number of vehicles in the vicinity group, c is the remaining driving time of a trip corresponding to a vehicle, and p is the remaining driving distance of the trip. Thus, scheduled maneuvers of each vehicle can be scheduled such that total remaining driving time is within the greatest allowable driving time, such as, e.g., the deadlines 405.

The dynamic schedule 406 can be generated by the scheduler 410 as a result of the priority calculator 412 and utilization optimizer 416 scheduling decisions. The dynamic schedule 406 can be communication to each vehicle in the vicinity group such that each vehicle can autonomously navigate the roadway according to the schedule. However, the leader of the vicinity group can also control the group directly by sending control decisions according to the dynamic schedule to each vehicle using a group controller 418. The group controller 418 can include, e.g., a transmitter, receiver, transceiver, or other communication device for V2V communication. As a result, all vehicle in the vicinity group can maneuver in traffic preempting late arrivals by coordinating according to a dynamic schedule.

Referring now to FIG. 5, a block/flow diagram showing a system/method of distributed traffic scheduling for the autonomous vehicles is depicted according to an embodiment of the present invention.

At block 501, a vicinity group of autonomous vehicles is formed within a vicinity of each other by pinging each of the autonomous vehicles with each other of the autonomous vehicles using vehicle-to-vehicle communication.

At block 502, a leader of the vicinity group is elected by transmitting an election message to each of the autonomous vehicles from each other of the autonomous vehicles, each autonomous vehicle responding to a received election message with a vote, the leader being elected by receiving the most votes of the autonomous vehicles in the vicinity group.

At block 503, preferences of a driver corresponding to each of the autonomous vehicles are predicted with a classifier by extracting online account data and predicting preference labels for each feature of the online account data.

At block 504, the preference labels are learned by training a support vector machine with the predicted preferences.

At block 505, a trip deadline is determined for each autonomous vehicle according to the corresponding preferences.

At block 506, each of the autonomous vehicles in the vicinity group are scheduled to prevent exceeding the trip deadline by performing earliest deadline first scheduling of the vicinity group by the leader vehicle, including:

At block 507, maneuvers of each of the autonomous vehicles in the vicinity group are controlled according to the scheduling.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for distributed traffic scheduling for autonomous self-driving vehicles (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for scheduling traffic of autonomous vehicles, the method comprising:
    forming a vicinity group of autonomous vehicles by pinging other using vehicle-to-vehicle communication;
    electing a leader vehicle of the vicinity group by transmitting an election message to each of the autonomous vehicles from each other of the autonomous vehicles, each autonomous vehicle responding to a received election message with a vote, the leader vehicle being elected by receiving the most votes of the autonomous vehicles in the vicinity group;
    predicting preferences of a driver corresponding to each of the autonomous vehicles with a classifier by extracting preference labels from online account data;
    determining a trip deadline for each autonomous vehicle according to the corresponding preferences;
    scheduling each of the autonomous vehicles in the vicinity group to prevent exceeding the trip deadline by performing earliest deadline first scheduling of the vicinity group by the leader vehicle; and
    controlling maneuvers of each of the autonomous vehicles in the vicinity group according to the scheduling.

2. The method as recited in claim 1, further including learning the preference labels by training a support vector machine with the predicted preferences.

3. The method as recited in claim 1, wherein predicting the preferences includes:
    calculating an expected loss reduction by determining a confidence score of each of preference labels; and
    sorting the preference labels according to the expected loss reduction.

4. The method as recited in claim 3, further including training the classifier according to the preference labels having the highest confidence scores relative to each other preference label.

5. The method as recited in claim 1, wherein online account data include dates extracted from calendar appointments.

6. The method as recited in claim 1, wherein online account data include daily commute patterns.

7. The method as recited in claim 1, wherein scheduling each of the autonomous vehicles includes calculating a priority of each autonomous vehicle in the vicinity group according to a laxity of the trip deadline compared to an expected arrival time.

8. The method as recited in claim 1, wherein scheduling each of the autonomous vehicles includes generating a scheduling decision for one of the autonomous vehicles having a highest priority such that an average expected arrival time of the autonomous vehicles in the vicinity group is within an average deadline of the autonomous vehicles in the vicinity group.

9. The method as recited in claim 1, further including adjusting the scheduling periodically.

10. A method for scheduling traffic of autonomous vehicles, the method comprising:
    forming a vicinity group of autonomous vehicles by pinging other using vehicle-to-vehicle communication;
    electing a leader vehicle of the vicinity group by transmitting an election message to each of the autonomous vehicles from each other of the autonomous vehicles, each autonomous vehicle responding to a received election message with a vote, the leader vehicle being elected by receiving the most votes of the autonomous vehicles in the vicinity group;
    predicting preferences of a driver corresponding to each of the autonomous vehicles with a classifier by extracting online account data and predicting preference labels for each feature of the online account data;
    learning the preference labels by training a support vector machine with the predicted preferences;
    determining a trip deadline for each autonomous vehicle according to the corresponding preferences;
    scheduling each of the autonomous vehicles in the vicinity group to prevent exceeding the trip deadline by performing earliest deadline first scheduling of the vicinity group by the leader vehicle, including:
    calculating a priority of each autonomous vehicle in the vicinity group according to a laxity of the trip deadline compared to an expected arrival time;
    generating a scheduling decision for one of the autonomous vehicles having a highest priority such that an average expected arrival time of the autonomous vehicles in the vicinity group is within an average deadline of the autonomous vehicles in the vicinity group; and
    controlling maneuvers of each of the autonomous vehicles in the vicinity group according to the scheduling.

11. The method as recited in claim 10, wherein predicting the preferences includes:
    calculating an expected loss reduction by determining a confidence score of each of preference labels; and
    sorting the preference labels according to the expected loss reduction.

12. The method as recited in claim 11, further including training the classifier according to the preference labels having the highest confidence scores relative to each other preference label.

13. The method as recited in claim 10, wherein online account data include dates extracted from calendar appointments.

14. The method as recited in claim 10, wherein online account data include daily commute patterns.

15. The method as recited in claim 10, further including adjusting the scheduling periodically.

16. An autonomous vehicle for scheduling traffic of autonomous vehicles, the autonomous vehicle comprising:
    a communication system that communicates with nearby autonomous vehicles to form a vicinity group of autonomous vehicles by pinging each other of the autonomous vehicles using vehicle-to-vehicle communication;
    a vote counter that elects a leader vehicle of the vicinity group by transmitting an election message to each autonomous vehicle of the vicinity group, responding to a received election message with a vote, and counting votes received to compare with each of the autonomous vehicles and determine the leader vehicle;
    a preference engine that uses a classifier to predict preferences of a driver by extracting preference labels from online account data stored in a storage device;
    a deadline calculator that determines a trip deadline according to the predicted preferences;

a scheduler that schedules vehicle maneuvers to prevent exceeding the trip deadline by performing earliest deadline first scheduling; and a group controller that controls maneuvers according to the scheduling such that a group controller corresponding to each vehicle in the vicinity group agrees to the maneuvers.

17. The autonomous vehicle as recited in claim 16, further including a support vector machine that learns the preference labels by training with the predicted preferences.

18. The autonomous vehicle as recited in claim 16, wherein the classifier communicates the preferences to a scoring module that calculates an expected loss reduction by determining a confidence score of each of preference labels and sorts the preference labels according to the expected loss reduction.

19. The autonomous vehicle as recited in claim 16, further including a priority calculator that wherein calculates a priority of each autonomous vehicle in the vicinity group according to a laxity of the trip deadline compared to an expected arrival time to determine the scheduling.

20. The autonomous vehicle as recited in claim 16, further including a utilization optimizer that issues a scheduling decision for one of the autonomous vehicles having a highest priority such that an average expected arrival time of the autonomous vehicles in the vicinity group is within an average deadline of the autonomous vehicles in the vicinity group.

* * * * *